(12) United States Patent
Rudduck et al.

(10) Patent No.: US 7,854,580 B2
(45) Date of Patent: Dec. 21, 2010

(54) STUD FASTENER AND STABILISING DEVICE

(75) Inventors: Dickory Rudduck, Chicago, IL (US);
Lee David Blattmann, Wilmette, IL (US); Lachlan Richard Goldspink, Sydney (AU)

(73) Assignee: Telezygology Inc., Chicago, IL (US)

( * ) Notice: Subject to any disclaimer, the term of this patent is extended or adjusted under 35 U.S.C. 154(b) by 274 days.

(21) Appl. No.: 11/910,702

(22) PCT Filed: Mar. 30, 2006

(86) PCT No.: PCT/AU2006/000416

§ 371 (c)(1),
(2), (4) Date: Aug. 1, 2008

(87) PCT Pub. No.: WO2006/105585

PCT Pub. Date: Oct. 12, 2006

(65) Prior Publication Data

US 2009/0214316 A1   Aug. 27, 2009

(30) Foreign Application Priority Data

Apr. 4, 2005   (AU) .............................. 2005901640

(51) Int. Cl.
*F16B 21/18* (2006.01)

(52) U.S. Cl. ...................................... 411/511; 411/909

(58) Field of Classification Search ................. 411/511, 411/909, 433, 434; 285/306, 317; 292/304, 292/254; 244/137.4
See application file for complete search history.

(56) References Cited

U.S. PATENT DOCUMENTS

| 4,929,135 A | * | 5/1990 | Delarue et al. .............. 411/354 |
| 5,129,753 A | | 7/1992 | Wesley et al. |

(Continued)

FOREIGN PATENT DOCUMENTS

JP   9280158   10/1997

(Continued)

*Primary Examiner*—Gary Estremsky
(74) *Attorney, Agent, or Firm*—Heather A. Kartsanes

(57) ABSTRACT

The invention relates to a stabilising device (120) for an assembly which includes two shape memory alloy wires (104, 106) adapted to operate in conjunction. The stabilising device (120) includes a rocker plate (108) for attachment to each of the shape memory alloy wires; the rocker plate (108) is adapted to pivot when one shape memory alloy wire (104 or 106) is subjected to a stress greater than that to which the other shape memory alloy wire (106 or 104) is subjected, in order to reduce the stress on the first-mentioned shape memory alloy wire. The invention further relates to a fastener (60) including a stud (54) having a locking cavity (56), an aperture (58) adapted to receive the stud (54), a locking means (teeth) (62) adapted to engage the locking cavity (56), a shuttle (66) rotatable by a rotating means including material adapted to contract when activated and a plug (87) slidable within the shuttle (66) to close off the aperture (58) when not occupied by the stud (54). The shuttle (66) is rotatable by the rotating means between a locking position, in which the locking means (teeth) (62) engages the locking cavity (56), and an unlocking position in which the locking means (teeth) (62) does not engage the locking cavity (56). The plug (87) can help to prevent contamination of the fastener (60).

7 Claims, 5 Drawing Sheets

U.S. PATENT DOCUMENTS

| | | | |
|---|---|---|---|
| 5,603,595 A * | 2/1997 | Nygren, Jr. | ................ 411/14.5 |
| 5,630,671 A | 5/1997 | Larson | |
| 5,771,742 A | 6/1998 | Bokaie et al. | |
| 6,126,115 A | 10/2000 | Carrier et al. | |
| 6,398,450 B1 | 6/2002 | Jarvis | |
| 6,467,987 B1 | 10/2002 | Larsen et al. | |
| 6,530,718 B2 | 3/2003 | Nygren et al. | |
| 6,646,240 B2 | 11/2003 | Jarvis | |
| 6,712,542 B2 | 3/2004 | Buder | |
| 2002/0050045 A1 | 5/2002 | Chiodo et al. | |
| 2002/0102130 A1 | 8/2002 | Nygren et al. | |

FOREIGN PATENT DOCUMENTS

| | | |
|---|---|---|
| JP | 2004156550 | 6/2004 |
| JP | 2004306648 | 11/2004 |
| WO | WO02/057627 | 7/2002 |
| WO | WO 2004/101216 | 11/2004 |
| WO | WO2005/047714 | 5/2005 |

* cited by examiner

FIGURE 5
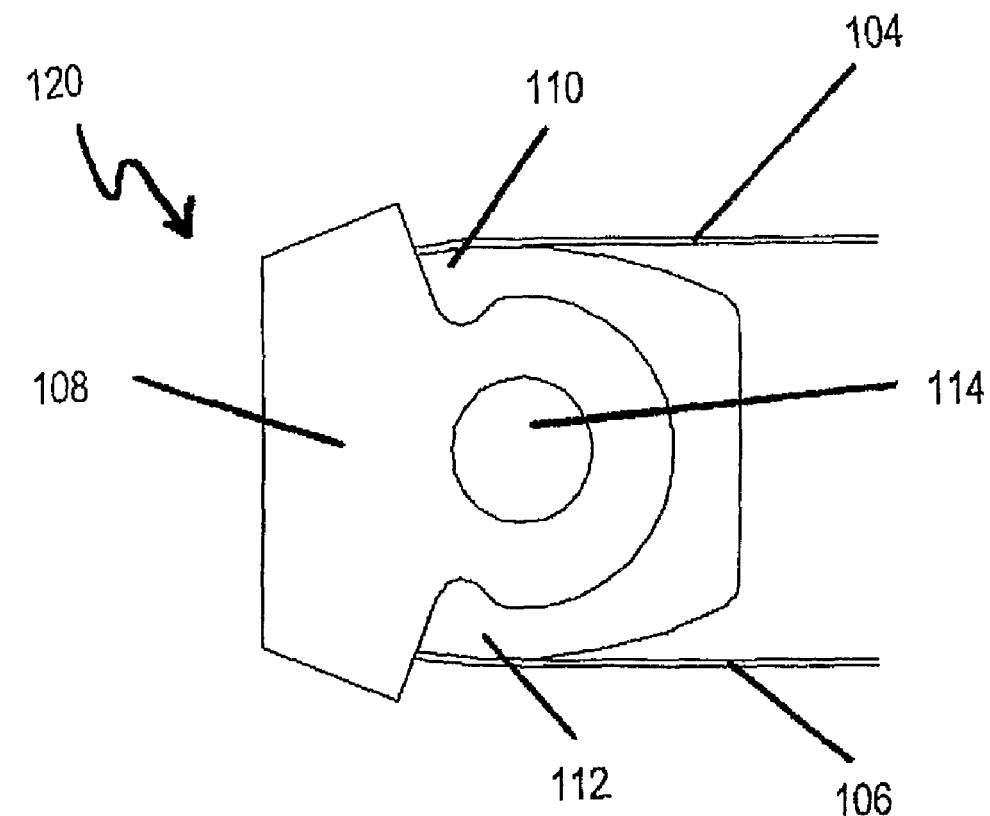
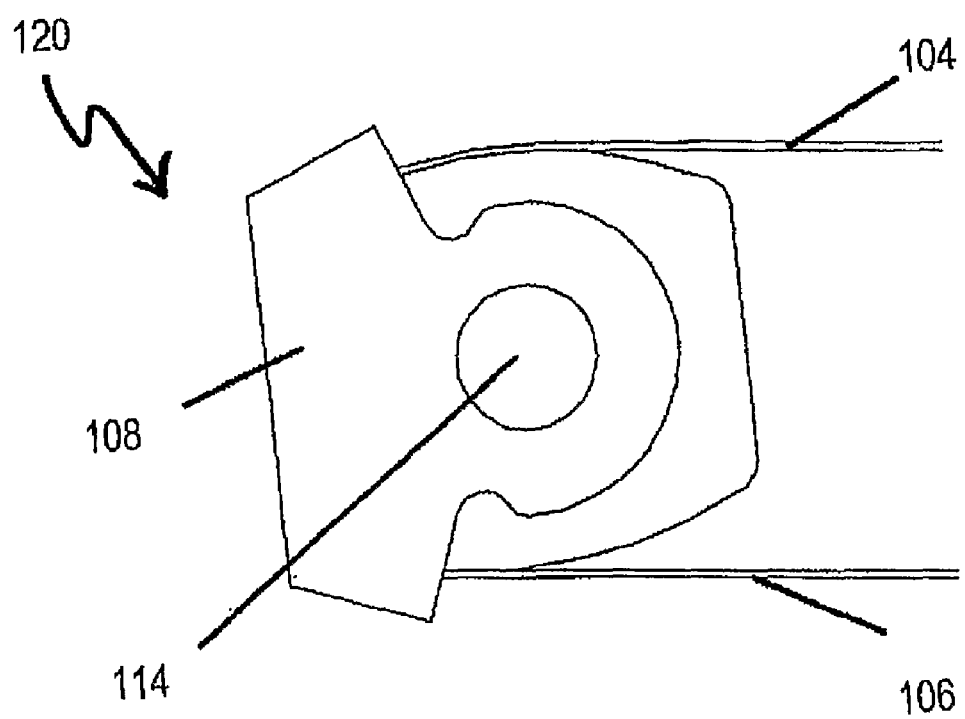
FIGURE 6

STUD FASTENER AND STABILISING DEVICE

FIELD OF THE INVENTION

This invention relates to fastener assemblies and to stabilising devices. In particular, the invention concerns a stud fastener with a slidable plug to help prevent contamination of the fastener mechanism. The invention also concerns a stabilising device to reduce the stress on shape memory alloy wires of, for example, a fastener.

BACKGROUND OF THE INVENTION

In a first aspect, the invention is concerned with a stud fastener. Stud fasteners are useful in many applications. They can be used, for example, to close doors, being attached to a door frame and adapted to receive a stud on a door. A stud fastener can be used in many other applications. In a second aspect, the invention is concerned with a stabilising device, especially for (but not limited to) a fastening assembly which uses shape memory alloy wires. The stabilising device can operate to reduce the stress on the shape memory alloy wires.

Australian Provisional Patent Application No. 2004905399 (the "Provisional Application"), the contents of which are imported herein by reference, disclosed a fastener including:

- a stud having a locking cavity;
- an aperture adapted to receive the stud;
- locking means adapted to engage the locking cavity; and
- a shuttle rotatable by rotating means including material adapted to contract when activated, the shuttle being rotatable by the rotating means between a locking position, in which the locking means engages the locking cavity, and an unlocking position in which the locking means does not engage the locking cavity.

One embodiment of the fastener was described in the Provisional Application and this is an especially preferred embodiment. A second embodiment was described in connection with international patent application number PCT/AU2004/000623, the contents of which are also imported herein by reference. For convenience, some of the features of the first embodiment are set out below.

First Embodiment

The Provisional Application

The stud may take the form of a pin or peg, with the locking cavity preferably being a groove around all or part of the stud. Preferably, the stud in the region of a locking cavity is of circular cross section, but the invention is not limited to this embodiment.

The aperture adapted to receive the stud is preferably of the same shape as the cross sectional shape of the stud, eg, circular. The aperture may take any other suitable shape.

The locking means adapted to engage the locking cavity is preferably one or more teeth adapted to engage the locking cavity, such as the groove.

The shuttle which is rotatable by the rotating means is rotatable between a locking position in which the locking means such as the teeth engage the locking cavity, such as the groove, and an unlocking position in which the locking means do not engage the locking cavity. The shuttle preferably incorporates means which engages the locking means in the locking position and which fail to engage the locking means or which move the locking means out of engagement with the locking cavity in the unlocking position.

In a particularly preferred embodiment, the shuttle has one or more apertures into which the locking means may be received in the unlocking position. When the locking means, such as teeth, are not in these apertures, the shuttle is designed to push the locking means into the locking cavity and hence to the locking position.

In another embodiment, the shuttle may include or be associated with means adapted to engage the locking means and draw them out of engagement with the locking cavity, when the shuttle is rotated to the unlocking position.

The shuttle is rotatable by rotating means which includes material adapted to contract when activated. Preferably, this material is shape memory alloy wire, as discussed below. It is further preferred that the shape memory alloy wire is wound around the shuttle which is rotatable within a body for the fastener. The shape memory alloy wire is attached at one end to the shuttle and at the other to a non-rotatable part of the fastener. When the shape memory alloy wire is caused to contract by the application of suitable energy to reach the necessary temperature, the shuttle can rotate from the locking position to the unlocking position. A second shape memory alloy wire may be similarly connected to the shuttle in order to rotate it from the unlocking position to the locking position.

Shape memory alloys are known and are usually made predominantly or wholly of titanium and nickel. They may also include other material, such as aluminum, zinc and copper. A shape memory alloy is capable of adopting one shape below a predetermined transition temperature and changing to a second shape once its temperature exceeds the transition temperature. Conversely, when the shape memory alloy cools below the transition temperature, it is capable of adopting the first shape again.

Shape memory alloy wire currently available, such as that sold under the trade mark Nitinol, is capable of contracting by about 3 percent when activated by heating.

Activation of the material adapted to contract when activated is preferably achieved through electrical resistance heating, with a wire feed to the assembly.

The fastener of the invention may include lock status sensors, which can report whether the fastener is in the locked or unlocked state. Such sensors may act as a reed switch, for example, so that when they make contact a report is generated that the fastener is in the locked or unlocked state, depending on the construction of the fastener. The lock status sensors may also work by enabling completion of an electrical circuit. Other configurations and means of sensing may also be applicable.

The fastener of the invention also preferably includes bias means, such as a spring, biasing the fastener towards the locked state. The fastener of the invention also preferably includes an ejector spring, to assist ejection of the stud when the locking means is no longer engaged with the locking cavity.

The fastener of the invention may also include a temperature sensor for sensing the temperature of the shape memory alloy wire in the preferred embodiments. This can adjust the amount of energy applied to the shape memory alloy wire, depending on sensed temperature, to take into account varying conditions. For example, if the temperature is relatively low, a larger amount of power may need to be delivered to the shape memory alloy wire to heat it to the desired temperature. Conversely, if the temperature is high, the amount of power to be delivered to the shape memory alloy wire in order to cause it to contract may be far less. A temperature sensor can enable feedback and cause adjustment of power delivery in this regard.

Optionally, the fastener of the invention has manual override so that the fastener can be released even if the shuttle cannot rotate to the unlocking position. A manual override may be necessary, for example, if there is no power to activate the shape memory alloy wire, or if the fastener fails for some reason. A manual override is disclosed in the Provisional Patent Application and will not be further detailed here.

DISCLOSURE OF THE INVENTION

First Aspect

It has been found that useful variations may be made to the fastener described above and these will now be discussed.

It is preferred that the fastener includes means to relieve stress on the material adapted to contract when activated, in the event that the mechanism is jammed or under extreme load. Preferably, this means takes the form of an overstress spring. This was disclosed in International Patent Application No. PCT/AU2004/001580. The contents of this specification are also imported herein by reference.

It is preferred that the fastener includes a plug which can close off the opening of the fastener when in the unlocked state. Accordingly, this invention provides a fastener including:

a stud having a locking cavity;
an aperture adapted to receive the stud;
locking means adapted to engage the locking cavity;
a shuttle rotatable by rotating means including material adapted to contract when activated, the shuttle being rotatable by the rotating means between a locking position, in which the locking means engages the locking cavity, and an unlocking position in which the locking means does not engage the locking cavity; and
a plug slidable within the shuttle to close off the aperture when not occupied by the stud.

Preferably, the plug is biased towards the aperture by a compression spring which also acts to eject the stud when the locking means is disengaged from the locking cavity of the stud. It is preferred that the compression spring is longer and more robust than the spring disclosed in the drawings of the Provisional Application.

It is also preferred that the plug provides a fluid-tight seal when it occupies the aperture, in order to prevent contamination of the fastener mechanism.

In the Provisional Application, the inclusion of lock status sensors was discussed, Lock status sensors can detect if the fastener is in a locked or unlocked state. An example was given of a reed switch, but this was not limiting. Optical sensors may also be used, as another example. Optical sensors can detect if the stud is retained in the fastener assembly, and if the shuttle is in the fully locked state. If the fastener were to be only partially locked—for example, if the shuttle was not fully blocking the teeth, then the sensors could report this. Optical sensors may have more durability than mechanical sensors.

When the material adapted to contract when activated is shape memory alloy wire, such as Nitinol, it is preferred that the Nitinol wire is subject to a slightly lower strain during contraction, in order to enhance life cycles. For example, if the amount of contraction of the Nitinol wire is changed from 3% to 2.5%, the life cycles of the wire may be as many as 300,000 cycles.

A torsion spring may be used to rebias the shape memory alloy wire and to drive the shuttle into the locked position. A torsion spring may have a lower spring rate than the ring-style spring discussed in connection with the drawings in the Provisional Application.

It is also preferred that, when the fastener includes two parallel Nitinol wires, a stabilising device is used to ensure that the two wires share the load, in order to enhance life of the wires. This aspect of the invention is applicable not only to the stud fastener of the Provisional Application, but also to various other assemblies in which two shape memory alloy wires are used.

Second Aspect

In a second aspect, this invention provides a stabilising device for an assembly which includes a first shape memory alloy wire adapted to operate in conjunction with a second shape memory alloy wire in the assembly, wherein the stabilising device includes a rocker plate for attachment to each wire, the rocker plate being adapted to pivot when one shape memory alloy wire is subjected to a stress greater than that to which the other shape memory alloy wire is subject, in order to reduce the stress on the one shape memory alloy wire.

An example of the stabilising device is shown in connection with the drawings, below. Other configurations may be suitable.

BRIEF DESCRIPTION OF THE DRAWINGS

The invention will now be described in connection with certain non-limiting examples thereof in connection with the accompanying drawings, in which:

FIG. 5 is a plan view of an embodiment of the second aspect of the invention, being a stabilising device where neither shape memory alloy wire is stressed; and FIG. 6 is a view corresponding to that in FIG. 5 after stressing of one of the wires.

DETAILED DESCRIPTION OF THE DRAWINGS

Figure 1:
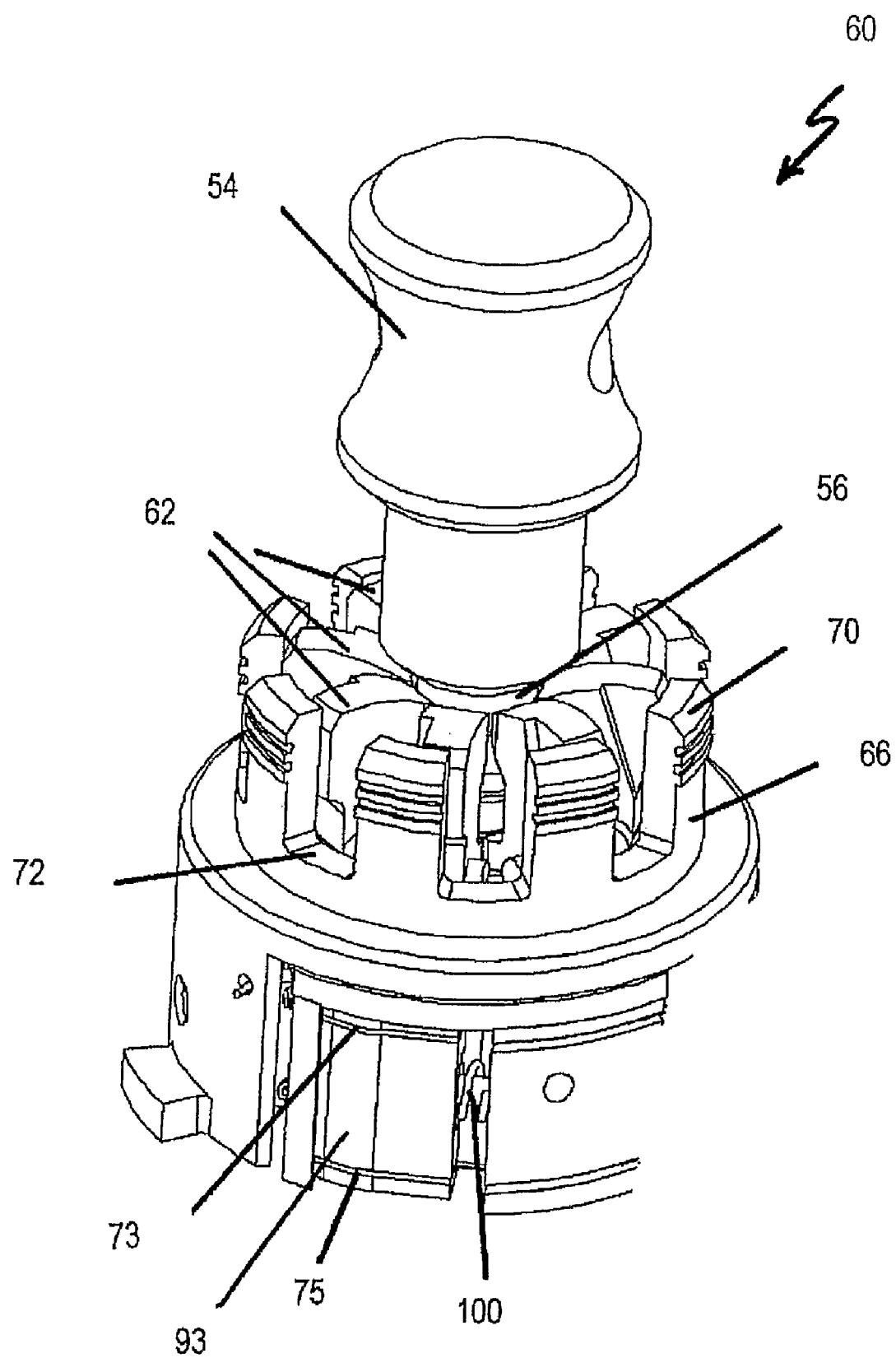
FIG. 1 is a perspective view of an embodiment of the first aspect of the invention, being a stud fastener in the locked position, with part of the outer body removed and some of the base on the right hand side omitted.

With reference to FIGS. 1 to 4, fastener 60 includes stud 54 having a locking cavity being circumferential groove 56. Fastener 60 includes aperture 58 (FIG. 2) into which stud 54 can be received by a push-fit Fastener 60 includes eight teeth 62, (three of which are labelled in FIG. 1) each having a tongue 64 (FIG. 2) which can engage groove 56.

Shuttle 66 is mounted for rotation within body 68 between two positions. The first position is that shown in FIGS. 1 and 2, where locking protrusions 70 maintain teeth 62 in the locking position into groove 56 of stud 54, when stud 54 is in aperture 58. The second position is that shown in FIGS. 3 and 4, in which shuttle 66 has rotated sufficiently so that teeth 62 are located in apertures 72 between locking protrusions 70. In this configuration, teeth 62 are no longer maintained in the locked position in groove 56 in stud 58.

Shuttle 66 is rotated from one position to the other through shape memory alloy wire running through guides 73 and 75

Figure 4:
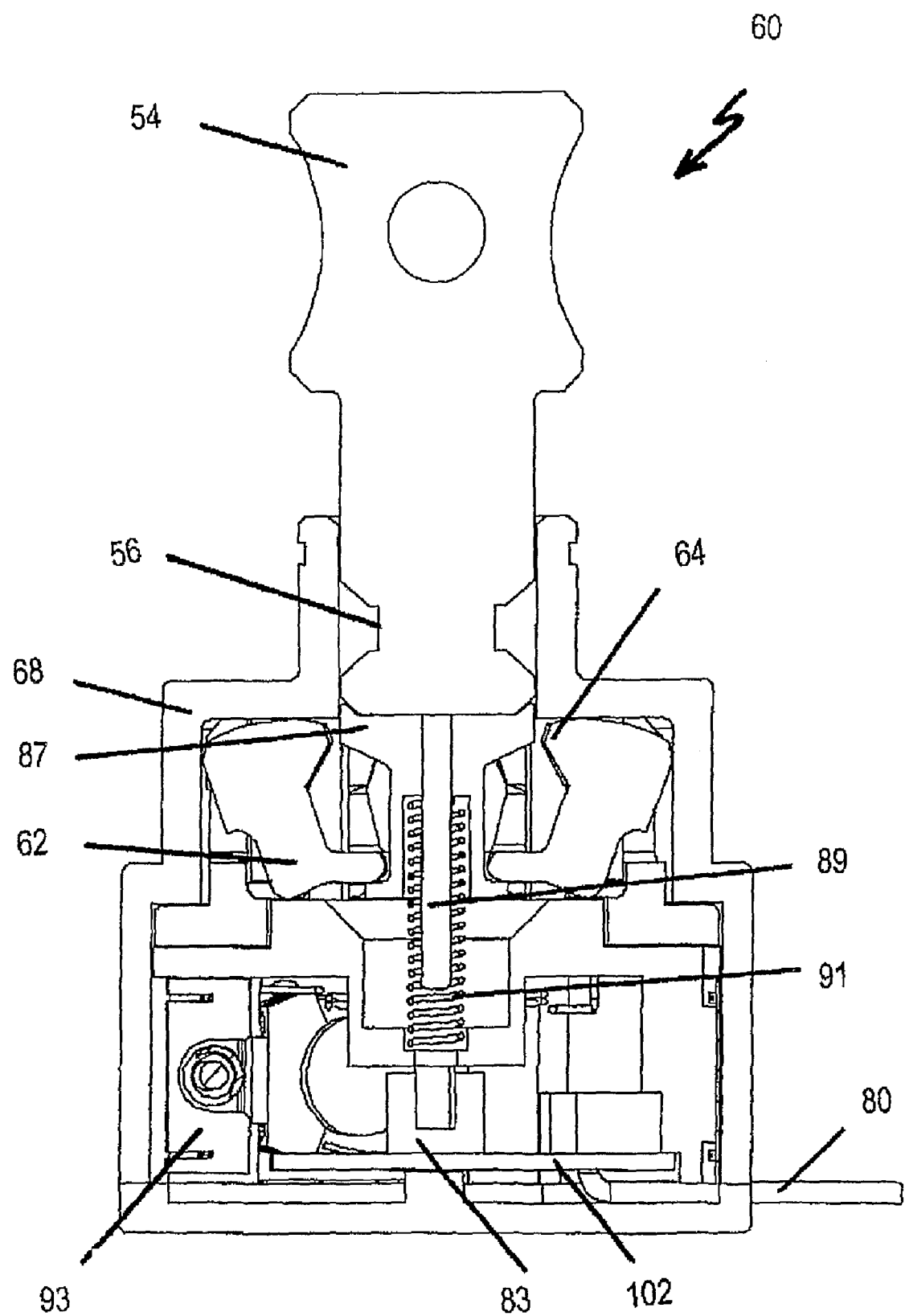
FIG. 4 is a view corresponding to that of FIG. 2, but in the unlocked position.

(FIG. 1), one being used to rotate shuttle 66 to the locking position and the other to rotate it to the unlocking position. The shape memory alloy wires are attached via crimp holder 93 as shown in FIGS. 2 and 4. Printed circuit board 102 supplies power and instructions to fastener 60 and handles reports.

Fastener 60 includes rear cap 78. Power is supplied via electrical wires 80.

Also shown in FIGS. 2 and 4 is stud optical sensor 83. This senses whether stud 54 is in the locked or unlocked position and can report to an external source (not shown).

Figure 2:
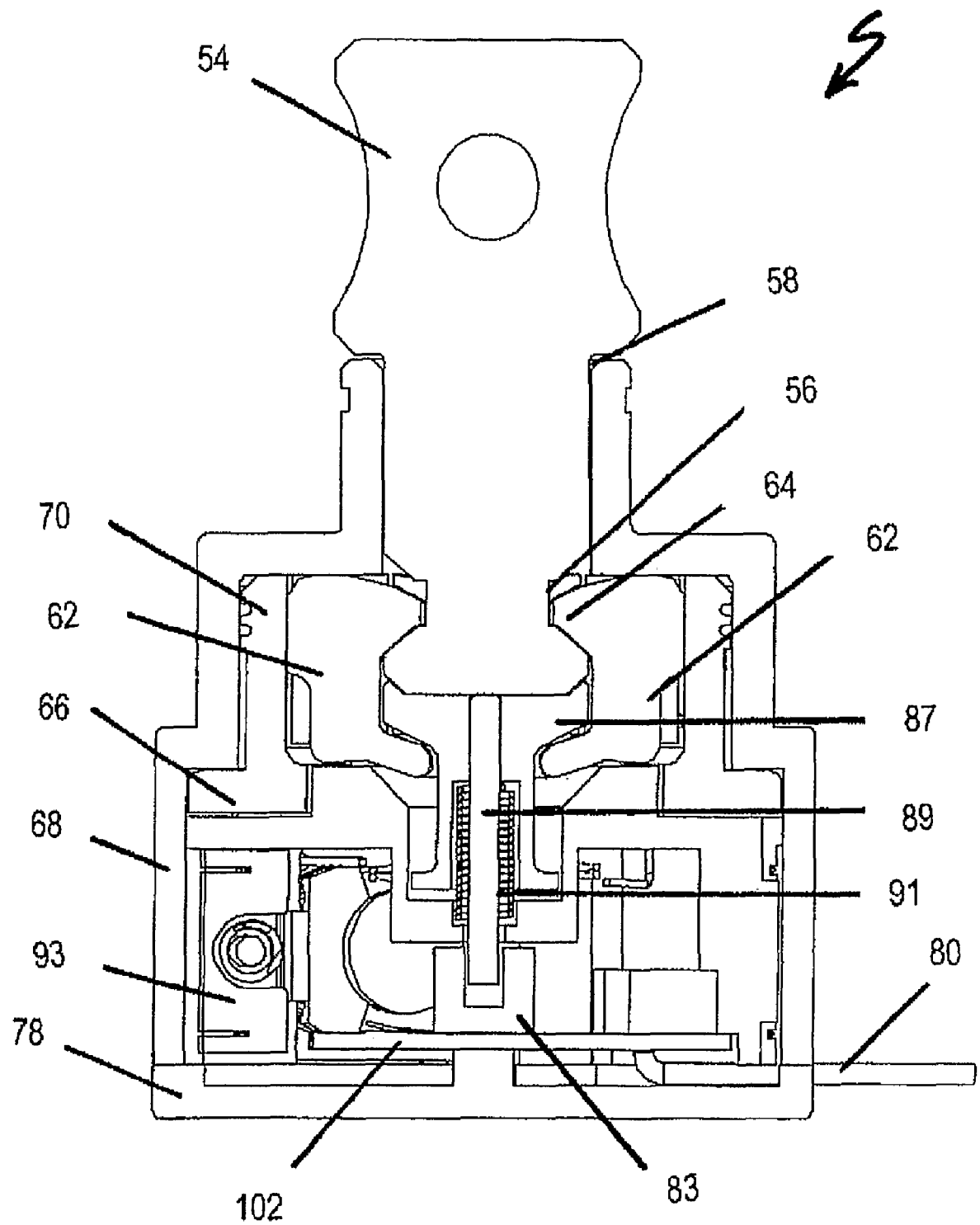
FIG. 2 is a side elevation in sectional view of the embodiment of FIG. 1, with the outer body in place.
Figure 3:
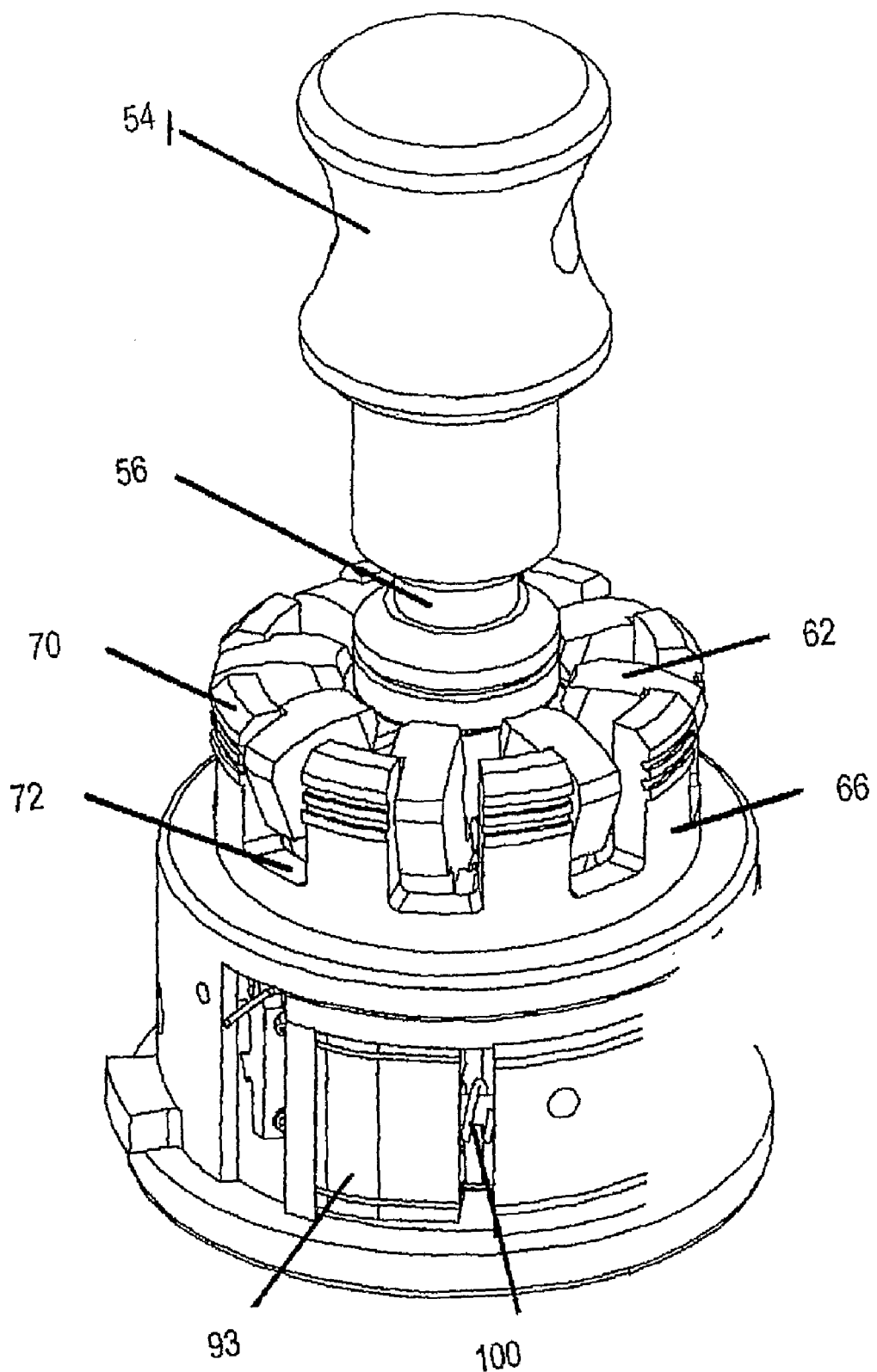
FIG. 3 is a view corresponding to that of FIG. 1, but in the unlocked position.

Fastener 60 also includes overstress spring 100 (refer FIGS. 1 and 3).

As best shown in FIGS. 2 and 4, fastener 60 includes in this embodiment sliding plug 87 mounted on detector pin 89. Compression spring 91 serves to urge sliding plug 87 to the position in which it closes off aperture 58, and also to cause ejection of stud 54 when unlocked. In the locked position (FIG. 2), optical sensor 83 detects detector pin 89. This enables fastener 60 to report that stud 54 is engaged. When stud 54 is released and ejected, as shown in FIG. 4, optional sensor 83 no longer detects pin 89 and fastener 60 can report that it is unlocked.

Reference is now made to FIGS. 5 and 6, in which stabilising device 120 is illustrated.

Each of first shape memory alloy wire 104 and second shape memory wire 106 is attached to rocker plate 108 by suitable means (not shown). Rocker plate 108 can pivot about pin 114 and has a groove along each edge 110 and 112 to act as a guide for wire 104 and wire 106 respectively.

If wire 104 contracts, rocker plate 108 will pivot about pin 114 to transfer a small amount of stress, in the form of elongation to wire 106. The reverse will happen if it is wire 106 which contracts (as shown in FIG. 6). In this way, when one shape memory alloy wire is subjected to a stress greater than that to which the other shape memory alloy wire is subject, the stress on the first wire is reduced by stressing the other shape memory wire to a small extent.

INDUSTRIAL APPLICABILITY

As will be readily appreciated by those skilled in the various arts, the invention disclosed herein are not limited to the examples set out and have wide applications in many areas, representing significant advances in the relevant art. In particular, the invention provides a fastener which is less subject to contamination, and a stabilising device which can enhance the operation and longevity of devices using shape memory alloy wire.

The invention claimed is:

1. A fastener including:
   a stud having a locking cavity;
   an aperture adapted to receive the stud;
   locking means adapted to engage the locking cavity;
   a shuttle rotatable by rotating means including material adapted to contract when activated, the shuttle being rotatable by the rotating means between a locking position, in which the locking means engages the locking cavity, and an unlocking position in which the locking means does not engage the locking cavity; and
   a plug slidable within the shuttle to close off the aperture when not occupied by the stud.

2. The fastener of claim 1, wherein the plug is biased towards the aperture by a bias means.

3. The fastener of claim 2, wherein the bias means is a compression spring.

4. The fastener of claim 1, wherein the plug is adapted to provide a fluid-tight seal when it closes off the aperture.

5. The fastener of claim 1, including at least one optical sensor to detect if the fastener is in the locked or unlocked position.

6. The fastener of claim 1, wherein the material adapted to contract when activated includes two shape memory alloy wires.

7. The fastener of claim 6 which includes a stabilizing device for an assembly which includes two shape memory alloy wires adapted to operate in conjunction with each other, the stabilizing device including a rocker plate for attachment to each of the shape memory alloy wires, the rocker plate being adapted to pivot when one shape memory alloy wire is subjected to a stress greater than that to which the other shape memory alloy wire is subject, in order to reduce stress on the one shape memory alloy wire.

* * * * *